United States Patent

Baumaire et al.

[11] Patent Number: 4,570,489
[45] Date of Patent: Feb. 18, 1986

[54] APPARATUS FOR DETECTING THE EVOLUTION OF AN ACOUSTIC SIGNAL

[75] Inventors: Alain Baumaire, Paris; Thierry Desmas, Montigny le Bretonneux; Guy Vambenepe, Rueil Malmaison, all of France

[73] Assignee: Service National Electricite de France, Paris, France

[21] Appl. No.: 513,607

[22] Filed: Jul. 14, 1983

[51] Int. Cl.⁴ .............................................. G01M 3/24
[52] U.S. Cl. .................... 73/658; 73/40.5 A; 376/252
[58] Field of Search ................. 73/658, 659, 661, 592, 73/40.5 A; 376/252, 251, 250; 340/605

[56] References Cited

U.S. PATENT DOCUMENTS

| | | | |
|---|---|---|---|
| 3,508,433 | 4/1970 | Bustin | 73/40.5 A |
| 3,592,967 | 7/1971 | Harris | 73/40.5 A |
| 4,253,167 | 2/1981 | Flournoy et al. | 73/40.5 A |
| 4,287,581 | 9/1981 | Neale, Sr. | 73/40.5 A |

FOREIGN PATENT DOCUMENTS

| | | |
|---|---|---|
| 130289 | 3/1978 | Fed. Rep. of Germany . |
| 2253219 | 6/1975 | France .............................. 376/252 |

Primary Examiner—Stephen A. Kreitman
Attorney, Agent, or Firm—Michael N. Meller

[57] ABSTRACT

Apparatus for detecting the evolution of an acoustic signal, comprising an acoustic sensor, as well as circuits for the amplification, filtering, detection and measurement of the effective value of the signal supplied by the sensor. The apparatus comprises a smoothing circuit, a sawtooth generator, an adder, a circuit for adjusting the effective value by straight segments and a circuit for carrying out sequence tests. The apparatus is adapted for use in the monitoring of steam generators in fast neutron reactors.

3 Claims, 9 Drawing Figures

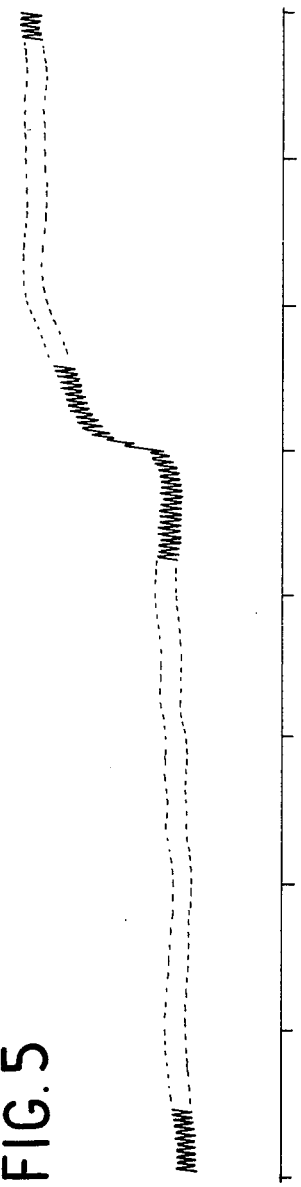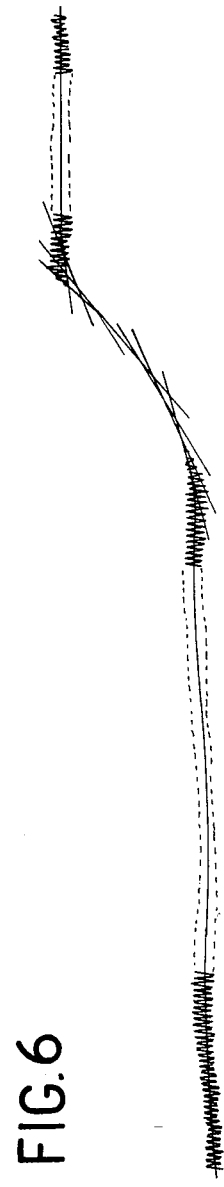
FIG. 5
FIG. 6

APPARATUS FOR DETECTING THE EVOLUTION OF AN ACOUSTIC SIGNAL

BACKGROUND OF THE INVENTION

The present invention relates to an apparatus for detecting the sudden evolution of an acoustic signal used for acoustic monitoring and in particular for leak detection. It is more especially used in inspection installations for fast neutron reactors, where it makes it possible to detect leaks in the heat exchange wall of a sodium-heated steam generator. However, it can be used whenever it is desired to detect a leak in a random member.

In a fast neutron nuclear reactor, the steam generator generally comprises steel tubes, within which water and steam circulate under high pressure. Liquid sodium carrying the heat given off by the reactor core circulates outside the tubes. The tubes form the heat exchange walls between the water and the sodium. The water evaporates within the tubes and the thus formed steam is used for driving turbines.

Due to the high chemical affinity between water and sodium, any sealing defect in a tube must be rapidly detected. Thus, any leak of water into the sodium can on the one hand evolve suddenly (leaking at a rate of a few to one hundred grams per second) producing a high pressure field and, on the other hand, can seriously damage the generator through the perforation of adjacent tubes under the action of an erosion—corrosion phenomenon.

At present, two sealing defect detection means are used, constituted by means for detecting hydrogen (in the sodium and in the argon) and safety diaphragms.

A hydrogen detection apparatus continuously measures the hydrogen concentration in the sodium at the outlet from equipment, or in the argon of the covering gases. The sensitivity is excellent, because such an apparatus is able to detect leaks having a flow rate of less than 1 g/sec. However, the response time is long and, in certain cases, may be excessive compared with the breakdown or perforation time of the tubes adjacent to the leak.

Safety diaphragms serve to prevent excessive overpressures within steam generators. They can be fractured by pressure waves produced in the apparatus by the sudden appearance of a leak and by the oscillation of the sodium mass between the argon volumes present in the secondary loop.

More recently a new leak detection procedure has been discovered, which uses acoustic means operating on the following principle. Acoustic sensors are placed on the steam generator to be controlled. Any leak of pressurized steam into the liquid sodium causes the generator walls to vibrate and this is superimposed on the vibration emanating from the different noise sources, i.e. outflow of sodium, outflow of steam, movements of various mechanical parts, equipment vibrations, relaxation of metal stresses, etc. All these vibrations are transmitted through the sodium and the metal parts up to the steam generator walls. The sensors supply a complex electrical signal which reflects all these waves. Its spectral range covers the audible band. The sound wave due to the leak gives rise to a characteristic signal, which is detected by an electronic system connected to the sensors.

Such a procedure is described, for example, in the reports of the ANS Conference, held at Richmond (WA), U.S.A., on Apr. 20-24, 1980, and particularly that of D. A. GREENE, F. F. AHLGREN and D. MENEELY entitled "Acoustic Leak Detection System for Sodium Heated Steam Generators".

Although this procedure has advantages, it is difficult to perform for the following reasons. The background noise detected by the acoustic sensors has an intensity depending on a large number of parameters and particularly the power of the reactor. Thus, if the power passes, e.g., from 20 to 80% of its maximum value, the background noise can be increased by 20 dB, which is considerable and largely masks an increase in the acoustic signal resulting from a leak. Thus, considerable importance is attached to the processing of the acoustic signal, if it is wished to reliably detect a leak and deliberately trigger an alarm.

SUMMARY OF THE INVENTION

The object of the present invention is to provide appropriate processing means able to detect the appearance of a leak.

The invention in particular rejects two prior art methods based on comparison with a fixed threshold, which if exceeded leads to the triggering of an alarm, and on comparison with a variable threshold, which is adjusted as a function of certain thermohydraulic parameters inherent in the installation.

Thus, for the reasons indicated hereinbefore, the detection of the exceeding of the threshold is not a reliable criterion with respect to the appearance of a leak. Thus, the present invention recommends the study of the slope of the acoustic signal and the detection of the appearance of a rapid variation in this slope.

When several control lines are used, a conventional procedure is employed for limiting the risk of untimely alarm. For this purpose, a certain coherence is imposed between the responses of the different monitoring lines. In order to be considered valid, a presumed alarm must satisfy the following conditions:

at least two lines monitoring the same apparatus must indicate a fault;
one line, placed on another apparatus, must not have a fault indication at the same time;
the thermohydraulic parameters must not have an excessive fluctuation.

BRIEF DESCRIPTION OF THE DRAWINGS

The invention is described in greater detail hereinafter relative to non-limitative embodiments and with reference to the attached drawings, wherein:

FIG. 5 shows the signal obtained by superimposing a sawtooth signal on the smoothed signal.

FIG. 6 shows an approximation of the preceding signal by straight segments.

DETAILED DESCRIPTION OF THE INVENTION

It is obvious that the following description only refers to a liquid sodium steam generator in an exemplified manner and that the scope of application of the invention is much more general.

Figure 1:
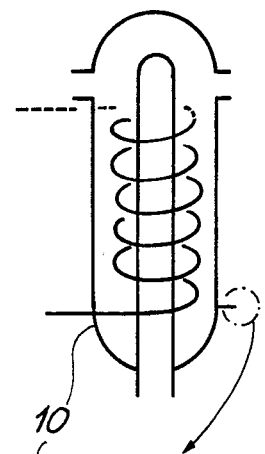
FIG. 1 is a diagrammatic view of the apparatus according to the invention.
Figure 1:
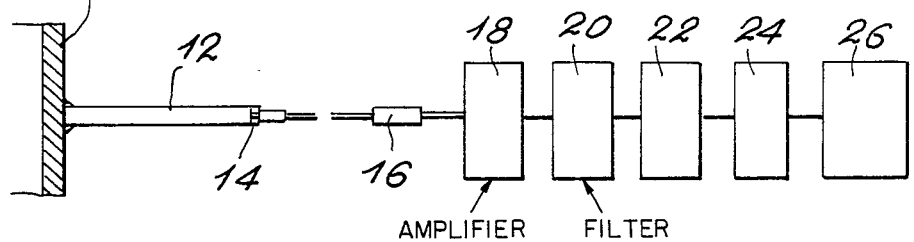
Figure 3:
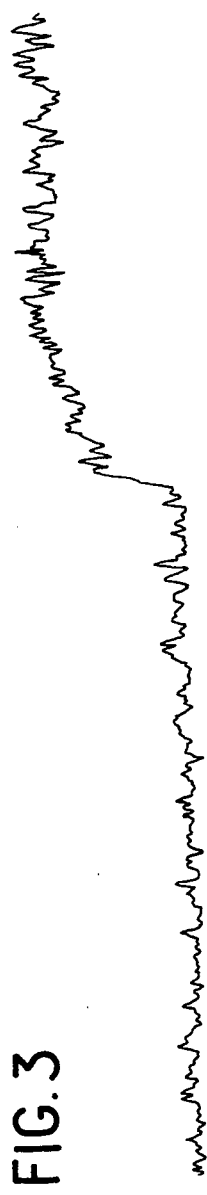
FIG. 3 is an example of a curve showing the variations in the effective value of the signal in the case when a leak appears.
Figure 4:
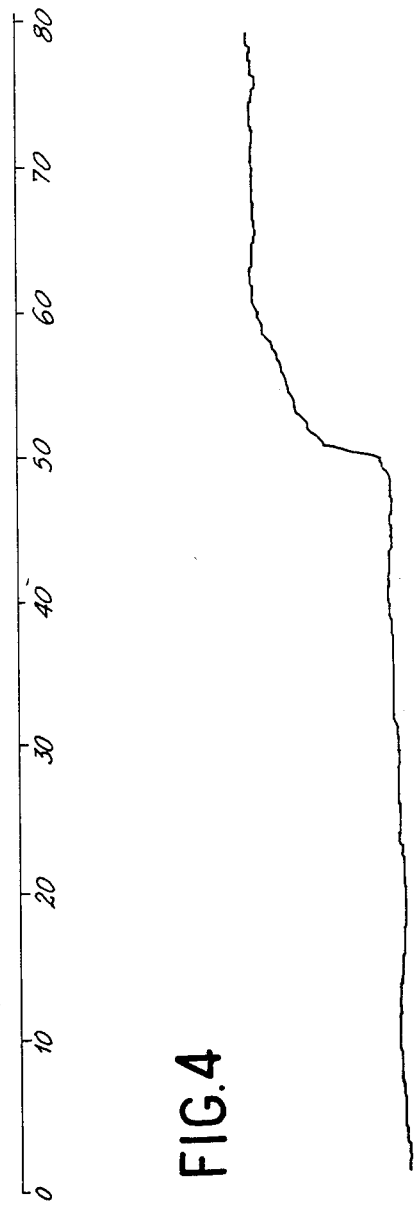
FIG. 4 shows a smoothed signal corresponding to the preceding situation.

In FIG. 1, a steam generator 10 is equipped with a metal rod 12, terminated by an accelerometer 14, connected to a charge converter. For example, the rod 12 is fixed to the outer ferrule of the steam generator. The accelerometer—converter assembly forms a piezoelectric transducer, which converts the vibrations of tube 10 into a voltage. This voltage is amplified by a circuit 18 and is filtered in a circuit 20. For example, it is possible to use a low-pass filter limiting the signal to a band below a few kilohertz, e.g., below 5 kHz. The filtered signal is then processed in a circuit 22, which supplies the effective value of the voltage. The shape of the signal obtained is shown in FIG. 3, where the time is plotted on the abscissa. The signal is then processed in an analysis circuit, which firstly consists of a smoothing circuit 24, which smooths the signal obtained, the smoothed signal being illustrated in FIG. 4. This smoothing can be obtained by sampling and determination of the median amplitude of the sampled signal. The analysis circuit further comprises an irregularity detection circuit 26, which makes it possible to trigger the alarm. According to the invention, this circuit is able to detect the appearance of a step in the smoothed signal, or in other words the appearance of a sudden increase in the effective value of the signal.

The investigation of such a step is based on two experimental observations. A leak of water into the sodium evolves in several phases. Following a first or incubation phase, which can last up to 1000 hours and during which the initial crack is resealed by corrosion products, there is a slow evolution phase of shorter duration (e.g. 1 hour), during which the flow increases up to a few grams per second. This phase is followed by a sudden evolution phase, with an increase in the flow rate to about 100 grams per second. Because the water—sodium chemical reaction is very exothermal, a leak of water into the sodium leads to the appearance of a pointed flame, which has the effect of melting the metal of one or more tubes adjacent to the leak. A crater develops in the metal of the affected tube and suddenly a through hole develops, which can have a diameter of a few. Thus, a new leak is produced and its flow rate can be a few hundred grams per second.

In both cases, the amplitude of the sound wave increases suddenly, so that a step appears in the evolution of the effective value of the signal.

Figure 2:
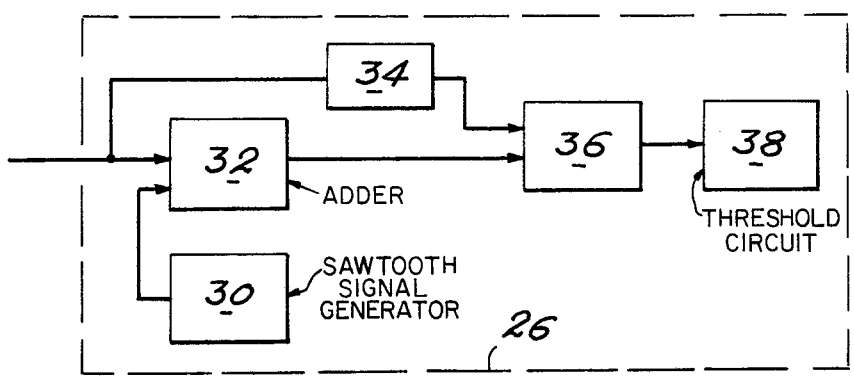
FIG. 2 is a synoptic diagram of a variant of the means for processing the signal supplied by the sensors.

The means which can be used for detecting the appearance of this step are shown in FIG. 2. A generator 30 supplies a sawtooth signal, which is superimposed in adder 32 on the smoothed signal. The signal obtained after adding the sawtooth signal is a notch-shaped signal, as illustrated in FIG. 5. A circuit 34 receives the smoothed signal and determines the straight segments which best approximate the smoothed signal, e.g. in the sense of the least squares. Such a circuit is known. The straight segments are shown in FIG. 6, superimposed on the notched signal. In that part where the signal is substantially constant, these segments virtually coincide with the smoothed signal. However, in that part where the signal increases suddenly, each segment is differentiated from the real signal. A circuit 36 analyzes the position of the notched signal with respect to these straight segments with the aid of a sequence test, which is performed in the following way. The signal constituted by the straight segments is supplied by circuit 34 and the notched signal is supplied by adder 32. Each top or apex of the notched signal is positioned either above or below the straight segment which, at this point, approximates the smoothed signal. If the smoothed signal varies little, the tops of the notched signal are alternately above and below the straight segment. If, for ease of explanation, the points located above the segment are designated by the symbol + and the points below the segment by the symbol −, it is possible to observe in circuit 36 a sequence of symbols of type + − + − + −, etc. However, if the smoothed signal suddenly increases, the segment which approximates it best falls very rapidly below the real value and the notched signal is completely above the segment. There is then a sequence of symbols + + + +, etc. Conversely, in the case of a sudden decrease of the signal, there is a sequence of symbols − − − −, etc.

Figure 7:
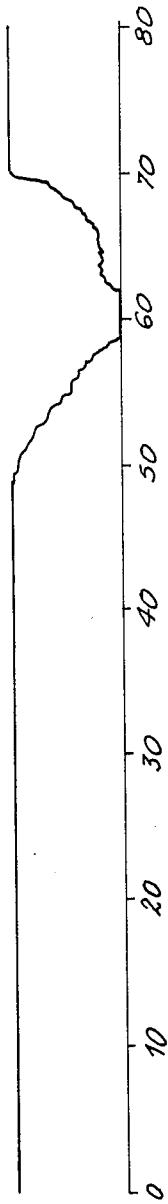
FIG. 7 shows variations in the number of signal sequences as a function of time.

Various sequence tests can then be performed, i.e., involving the counting of the number of groups of points having a configuration of + symbols or − symbols. There will be a large number of + − + − + − sequences in the case of only slight variations of the smoothed signal, but this number will fall as soon as there is a sudden rise of the signal, the initial state being restored when the smoothed signal is again almost constant. Such a variation is shown in FIG. 7, which clearly shows the sudden variation of the number obtained, indicating the increase in the slope of the smoothed signal.

Figure 8:
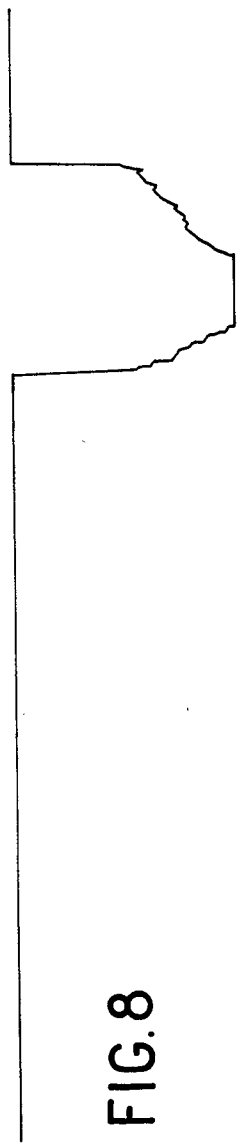
FIG. 8 shows the variation in a criterion, which is a function of the number of sequences, as well as the length of the first and last sequences.

It is possible to conceive more informative tests, as a function of the way in which the various sequences are rated as a function of their length, the number of their points, etc. For example, FIG. 8 shows the evolution of the number C defined in the following way: $C = N + R - P - L - E$, N is the number of points taken into consideration, R the number of sequences, P the length of the first sequence considered, L the length of the last sequence considered and E the evolution of the length of the last sequence. With such a criterion, it is possible to even more clearly show an amplitude change. Developments falling outside the scope of the present invention show that the number C is at most equal to 2N. It is then also possible to impose the condition $C = 2N$, if the slope of the straight line of the least squares is negative, which prevents the detection of negative variations of the slopes.

Whatever the result of the test, it is compared in a threshold circuit 38 for the detection of an abnormal evolution of the smoothed signal.

It should be observed that this threshold relates to the result of the test and not to the effective value of the actual signal, for the reasons referred to hereinbefore.

Tests were performed with the aid of an apparatus according to the invention. The sensitivity was measured by injections of different fluids (argon, hydrogen, steam) into the bundle of tubes of a steam generator. Eight injections were carried out at a pressure of 180 bars with a flow rate of approximately 500 mg/sec and an injection, at a pressure of a few bars with a flow rate varying between 6 and 1 g/sec.

All these injections were detected by analysis of the signal in accordance with the present invention, no matter what the operating conditions and the injection point. However, under nominal operating conditions, the evolution of the acoustic signal is limited, although significant.

The tests revealed that the sensitivity of the apparatus according to the invention is below that of hydrogen detection devices (which is below 1 g/sec). However, it is higher than that of safety diaphragms (above 2 kg/sec in the case of a fast fracture). Conversely, the response time of the apparatus is much shorter than in the case of hydrogen detection devices. Thus, due to the speed of sound in sodium, the transmission of information connected with the appearance of a leak is virtually instantaneous. However, the processing of the signal, necessary for the detection and validation of the alarm signal, takes a certain amount of time. Therefore, there is a certain time lag which is dependent both on the nature of the signals obtained and the detection method used. However, in all cases this lag does not exceed 10 seconds.

A nuclear power station safety system may comprise two control lines according to the invention, which are separated from one another and are each associated with a separate power supply. The system is subdivided into two subassemblies, each ensuring the necessary services for half the power station. The two subassemblies can be interconnected by an insulated 1500-V connection, so that information exchange takes place.

Figure 9:
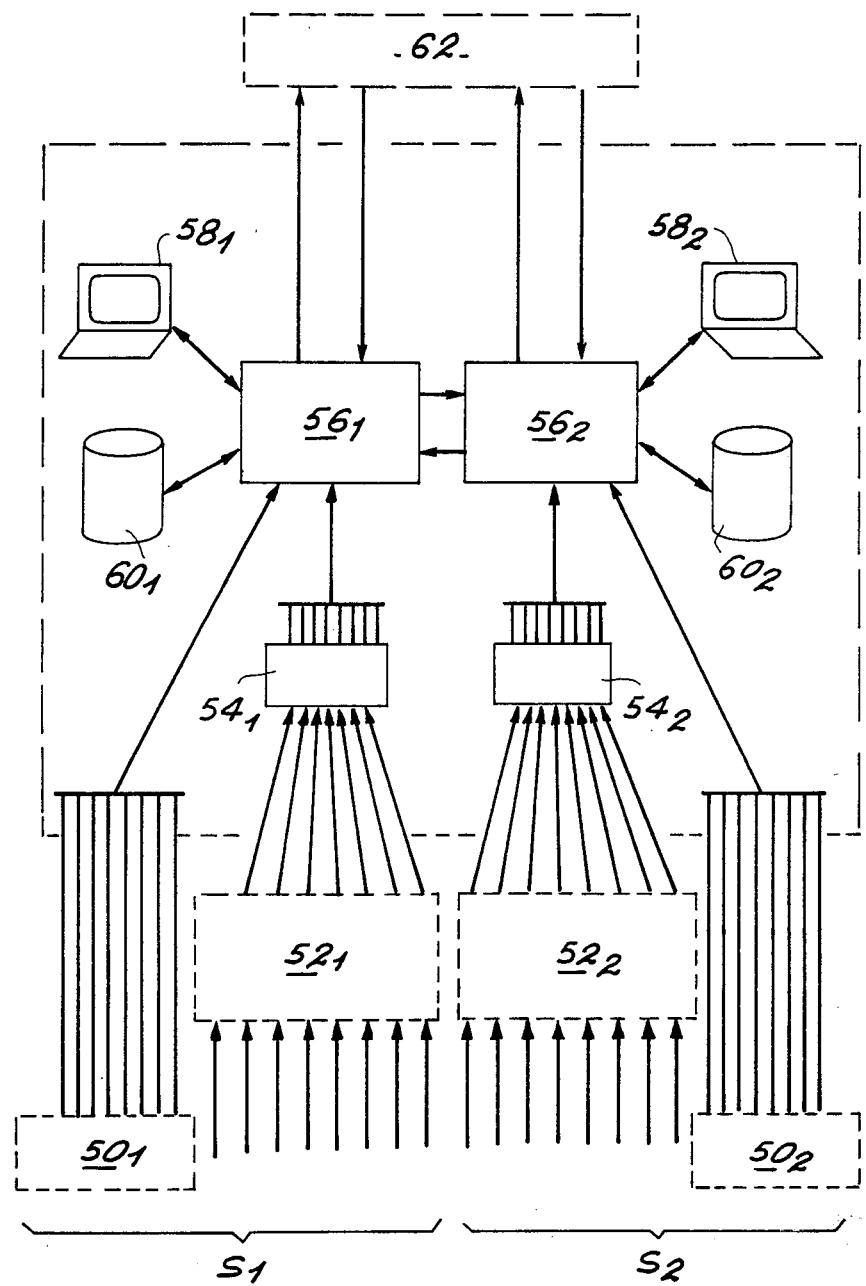
FIG. 9 shows the general architecture of a control system according to the invention.

The general architecture of such a monitoring system is shown in FIG. 9. Each subsystem $S_1$, $S_2$ is subdivided into three parts:

means for the analog acquisition of, on the one hand, thermohydraulic signals comprising circuits $50_1$ and $50_2$, and on the other hand of acoustic signals comprising circuits $52_1$, $52_2$;

an analog processing chain (filtering and determination of the effective value) constituted by circuits $54_1$, $54_2$;

a digital processing chain constituted by a processing circuit $56_1$, $56_2$, an alphanumeric console $58_1$, $58_2$ and a mass store $60_1$, $60_2$, the processing means being connected to the control room by an interface 62.

There can be five thermohydraulic signals per subsystem. They correspond to the measurements of the following parameters: water flow rate at the entrance to the equipment (2 signals), sodium flow rate (2 signals) and steam pressure on the balancing strap of the steam circuits (1 signal). The number of thermohydraulic signals can be extended to eight. There are eight acoustic signals (four per steam generator).

The digital processing chain can comprise, apart from the aforementioned members, a console, as well as a high-speed printing and recording device. The connection with the analog processing chain is, on the one hand, via an analog—digital converter and, on the other hand, via an analog chain control device.

The electronic circuit for analyzing the signal as described hereinbefore uses methods which, considered in isolation, are already known in the signal processing art. In this connection, reference can in particular be made to the work entitled "Random Data Analysis and Measurement Procedures", by Julius S. Bendat and Alan G. Piersol, published by Willey-Interscience and especially p. 235, which deals with sequence tests.

What is claimed is:

1. An apparatus for the detection of the sudden evolution of an acoustic signal received by acoustic sensors placed on a member, said acoustic sensors supplying an electrical signal, wherein said apparatus comprises a circuit for measuring the effective value of the signal supplied by the sensors and an electronic circuit for analyzing this effective value, wherein the analysis circuit comprises a circuit for smoothing the effective value of the signal, a sawtooth signal generator, an adder receiving the smoothed signal and the sawtooth signal and supplying a notched signal formed by the sum of said smoothed and sawtooth signals, a circuit receiving the smoothed signal and able to output a signal in the form of linear segments best approximating the smoothed signal, a test circuit connected to the adder supplying the notched signal and to the circuit supplying the linear segments, said test circuit being able to analyze the arrangement of the notched signal with respect to the signal in the form of linear segments with the aid of a sequence test, and a comparator connected to the test circuit and able to compare the result of the analysis with a predetermined threshold.

2. An apparatus according to claim 1, wherein the circuit for measuring the effective value is preceded by a low-pass filter operating below a few kilohertz.

3. An apparatus according to claim 1, wherein the member carrying the sensors is a steam generator, the apparatus being used for detecting leaks in said generator.

* * * * *